United States Patent
McCoy et al.

[15] 3,694,116
[45] Sept. 26, 1972

[54] APPARATUS FOR THE PRODUCTION OF FOAMED RESINS

[72] Inventors: John Gerald McCoy, Newport; William Rees Foster, Cwmbran, both of England

[73] Assignee: Monsanto Chemicals Limited, London, England

[22] Filed: Aug. 17, 1970

[21] Appl. No.: 64,554

Related U.S. Application Data

[62] Division of Ser. No. 726,857, May 6, 1968, Pat. No. 3,624,192.

[30] Foreign Application Priority Data

May 19, 1967 Great Britain..........23,303/67

[52] U.S. Cl. ......................425/4, 425/197, 425/461
[51] Int. Cl. ................................................B29f 3/04
[58] Field of Search...........18/12 P, 12 F, 5 P; 425/4, 425/197, 447, 449, 461, 464, 465, 466; 264/46, 47, 51

[56] References Cited

UNITED STATES PATENTS 3,349,434  10/1967  Hureau.....................425/464
3,406,230  10/1968  Baxter et al. ................264/51
3,222,722  12/1965  Reifenhauser........18/12 F UX
3,431,163  3/1969   Gilbert................18/12 F UX
3,431,164  3/1969   Gilbert................18/12 F UX
3,466,705  9/1969   Richie.................18/12 F UX

FOREIGN PATENTS OR APPLICATIONS 451,864  10/1948  Canada..........................425/4

Primary Examiner—Robert L. Spicer, Jr.
Attorney—Herbert B. Roberts, Arthur E. Hoffman and Patricia J. Hogan

[57] ABSTRACT

Die assemblies and processes for extruding a foamable thermoplastic polyvinylaromatic resin through a rectangular die orifice into a zone of lower pressure such that foaming of the resin occurs as it moves through the zone, said zone being defined by a pair of opposing concave surfaces maintained at a temperature lower than the extrusion temperature and curved so that they substantially conform to the corresponding surfaces of the freely expanding resin without exerting a substantial compressive force thereon. The die assemblies and processes are particularly useful for the production of low density foamed boards having smooth surfaces.

5 Claims, 2 Drawing Figures

PATENTED SEP 26 1972

3,694,116

APPARATUS FOR THE PRODUCTION OF FOAMED RESINS

CROSS-REFERENCES TO RELATED APPLICATIONS

This is a division of application Ser. No. 726,857, filed May 6, 1968, now U.S. Pat. No. 3,624,192.

BACKGROUND OF THE INVENTION

1. Field of the Invention

This application relates to the extrusion of foamable thermoplastic polyvinylaromatic resins and more particularly relates to improved processes for extruding such resins to form foamed products, e.g., low density boards, which are strong and have smooth surfaces.

2. Description of the Prior Art

Because of their excellent heat-insulating and other properties, foamed thermoplastic resins such as foamed polystyrene are useful industrial products. These products are often made by molding processes, but extrusion processes are often considered to be more convenient. However, extrusion processes present difficulties in some instances, e.g., in the production of foamed board of good quality. (The term "board" is used to describe flat sheet material of substantial thickness, usually at least 0.75 inch and often 1.5-4 inches thick, such as the sheet materials frequently used as insulating media.) For example, it is difficult to produce an extruded low density foamed polystyrene board having a good surface finish.

SUMMARY OF THE INVENTION

An object of the invention is to provide novel processes for extruding foamable thermoplastic polyvinylaromatic resins.

Another object is to provide novel processes for preparing extruded foamed boards, particularly low density boards, having a good surface finish.

These and other objects are attained by extruding a foamable thermoplastic polyvinylaromatic resin through a rectangular die orifice into a zone of lower pressure such that foaming of the resin occurs as it moves through the zone, said zone being defined by a pair of opposing concave surfaces maintained at a temperature lower than the extrusion temperature (i.e., the temperature of the resin at the die orifice) and curved so that they substantially conform to the corresponding surfaces of the freely expanding resin without exerting a substantial compressive force thereon.

DESCRIPTION OF THE DRAWING

An extrusion die assembly of the invention is exemplified (not to scale) in the drawing, in which.

Figure 1:
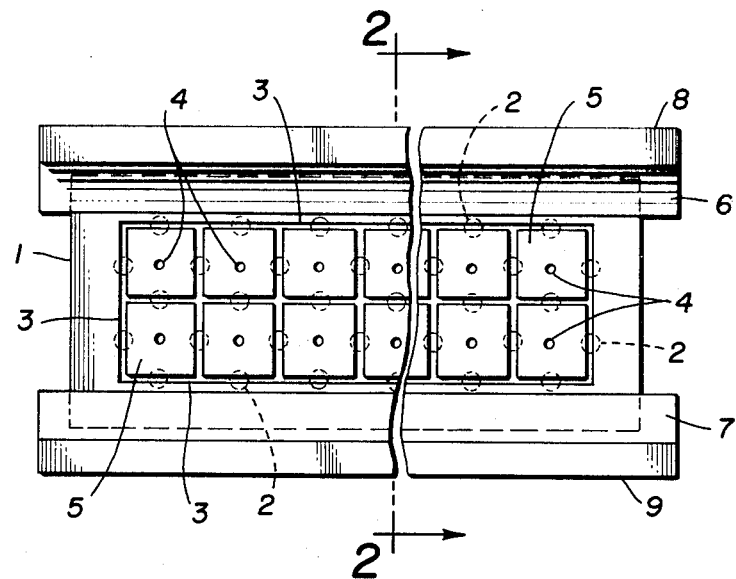
FIG. 1 is a front elevation of the assembly and FIG. 2 is a section along the line 2—2 in FIG. 1.
Figure 2:
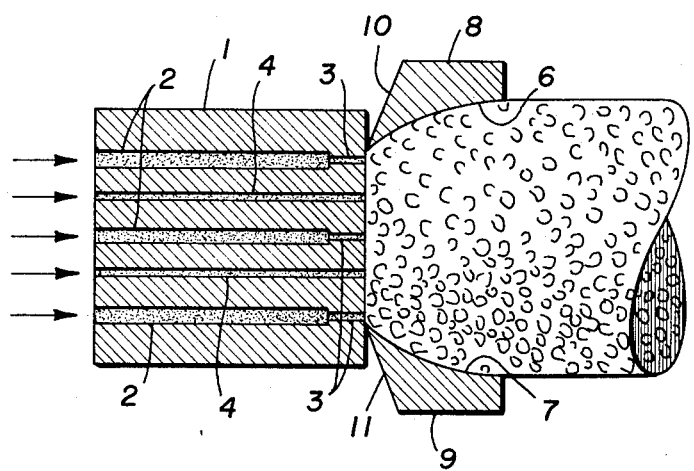

The die comprises a mild steel block 1 having 82 cylindrical channels 2 extending into it from one side. The channels are arranged to communicate with a rectangular network of three horizontal and 17 vertical intercommunicating slits 3. Each horizontal slit thus has 16 channels associated with it, and each vertical slit has two channels. There are also 32 cylindrical passages 4 extending completely through the block, each passage being positioned centrally in one of the square meshes 5 of the network of slits. The network of slits communicates with a zone defined by the profiled surfaces 6 and 7 of two mild steel plates 8 and 9. The length of each of the plates is greater (usually about 1.1-1.75 times greater) than the overall length of the slit network to ensure that the foamed resin surface is always in contact with the profiled surfaces during its initial expansion. The concave surfaces of the plates adjacent to the slit network are spaced apart at a distance corresponding approximately to the width of the slit network. The plates 8 and 9 are cut away as shown at 10 and 11 so as to minimize the area of contact with the block 1 and thus minimize heat transfer from the die outlet to the plates, and they have adjustable clamp mountings (not shown) by means of which they can be set at various distances from each other as desired. A series of liquid cooling channels (not shown) is drilled through each of the plates. The die also has means (not shown) for attaching it to the front end of an extruder so that, when the die is in use, a foamable resin such as foamable polystyrene is fed into the network of slits and thence through the zone into the atmosphere. The concave surfaces of the plates are so shaped that they conform to the corresponding surfaces of the freely expanding resin without exerting a substantial compressive force thereon.

DESCRIPTION OF THE PREFERRED EMBODIMENTS

The following example is given to illustrate the invention and is not intended as a limitation thereof.

EXAMPLE

Part A

Using the die assembly described above in which the overall length of the slit network is 1.535 inches, the width of the network is 0.785 inch, the width of the individual slits is 0.025 inch, the plates are clamped so that they are 0.79 inch apart at the lips of the die orifice and 1.375 inches apart at the end of the expansion zone, and the radius of curvature of the profiled surfaces of each of the plates is 0.5 inch, extrude foamable polystyrene containing 0.25 percent by weight of silica and 10 percent by weight of butane at a pressure of 700 psi and a temperature of 110° C. through the die at a flow rate of 15 pounds per hour, while maintaining the temperature of the plates at 15° C. by circulating cold water through the cooling channels.

The product is a foamed polystyrene board having a width of 2.75 inches, a thickness of 1.625 inches, an overall average density of 1.25 pounds per cubic foot, good strength in both the transverse and longitudinal directions, and smooth top and bottom surfaces with an excellent finish.

Part B

Repeat part A except for extruding the foamable polystyrene through the die directly into the atmosphere instead of using the plates to define a zone. The product is a foamed polystyrene board, the density of which is similar to that of the board of part A, but the surface finish of which is inferior in that it is slightly ribbed.

The die used in the practice of the invention is one having an orifice from which an extruded freely expanding and foaming resin issues with a rectangular or substantially rectangular cross section. According to a preferred embodiment of the invention the die is one which incorporates features designed to increase its resistance to resin flow, e.g., the dies described in British patents 1,034,120, 1,084,000, and 1,098,408 and in copending U. S. application Ser. No. 726,061, filed May 2, 1968 in the names of William R. Foster and Stanley J. Skinner and assigned to the assignee of the present application.

British patent 1,034,120 describes a die having extending into it at its inlet end a plurality of separate channels communicating with a number of slits arranged in the form of a network at the outlet end of the die, each slit having a row of channels associated with it. British patent 1,084,000 describes a die having a plurality of obstructions transversely distributed therein so that, when a foamable resin is extruded through the die, the obstructions together offer a substantial resistance to the flow of resin. British patent 1,098,408 describes a particularly useful type of die which comprises a plurality of channels extending into it at its inlet end and communicating with a number of slits arranged to form the meshes of a network at the outlet end of the die, each of at least the majority of the meshes having a substantially central passage leading back from the front face of the die to a point nearer the inlet end of the die (preferably to the inlet end of the die) and not communicating directly with the slits. U.S. application Ser. No. 726,061 filed May 2, 1968 and assigned to the assignee of the present application describes an improved die of the latter type wherein grooves extending from the outlet end of each of at least the majority of the passages toward the outlet of its surrounding mesh of slits are provided in the front face of the die to assist in ensuring that a strand of foamed resin extruded from each passage substantially fills the space formed by the enveloping foamed resin issuing from the surrounding mesh of slits.

In general the zone-defining surfaces have a concave curved cross section that preferably conforms exactly to the corresponding surfaces of the freely expanding and foaming resin. One manner in which it is possible to machine the surfaces so that they conform exactly is by using a working drawing produced from a photograph of the foaming resin extruding freely from the die orifice. Exact conformity is not essential, however, and a cross section corresponding to an arc of a circle usually provides a sufficiently good approximation. Other simple geometric shapes such as part of a parabola can also be used if desired.

At the die face the zone-defining surfaces are normally spaced apart by a distance equal to or slightly greater than the width of the die orifice, and from this point they diverge as the distance from the die increases, reaching their greatest distance apart where the foamed resin is completely expanded. Preferably they thereafter extend parallel to each other for a short distance. Their greatest distance apart depends of course on the overall width of the die orifice, the degree to which the foamable resin expands, and to some extent on the type of die which is used, but it is generally about 1.2–6 times the width of the die orifice. When the die incorporates features designed to increase the resistance to resin flow, the greatest distance apart of the zone-defining surfaces is usually 1.2–4 times, particularly 1.5–3 times, the overall width of the die orifice. For example, when the die is of the type described above and in British patent 1,098,408, particularly good results are obtained using zone-defining surfaces having a greatest distance apart corresponding to twice the overall width of the die orifice.

In general the curvature of the zone-defining surfaces is dependent on the thickness of the foamed board which it is desired to extrude, thicker boards normally requiring a larger radius of curvature for optimum results. For example, when a foamed board having a thickness of 1.5 inches is to be extruded through a die of the type described above and in British patent 1,098,408, excellent results are obtained when each of the zone-defining surfaces has a section corresponding to a segment of a circle having a radius of 0.5 inch.

From the position of maximum expansion, the resin board can be allowed to move through the air for a time while out of contact with other surfaces, but is is frequently desirable to support the board between a pair of flat parallel surfaces spaced apart at a distance corresponding to the thickness of the board. If desired, provision can be made for reducing or eliminating relative movement between the extruding foamed resin and the second pair of surfaces. For example, each of the second pair of surfaces can be part of an endless belt carried on rollers. The belt can be driven so that the part in contact with the resin moves along with it, or it can be free to move so that it is driven by the frictional force between it and the moving resin. Preferably the mounting of each endless belt is attached to one of the contoured surfaces so that the belt and the contoured surface move together when the position of the latter is adjusted. Alternatively, instead of being flat, each of this pair of surfaces can be constituted by a roller of relatively large diameter, or there can be a series of rollers traversed in succession by the extruding resin.

The polyvinylaromatic resin which is extruded in accordance with the invention is a polymer of one or more vinyl or vinylidene aromatic monomers such as styrene, a chlorostyrene, alpha-methylstyrene, o-, m-, or p-methylstyrene, other aralkylstyrenes, etc., including interpolymers of such monomers with one or more copolymerizable ethylenically unsaturated monomers such as acrylonitrile, methacrylonitrile, vinyl chloride, vinyl acetate, methyl and other alkyl acrylates and methacrylates, etc. The invention is particularly applicable to polystyrene resins, such as polystyrene itself or a toughened polystyrene, i.e., a polystyrene having physically or chemically combined therewith a minor proportion, e.g., 1–15 percent by weight, of a natural or synthetic rubber, e.g., substantially linear or branched polymers of conjugated dienes, such as butadiene, isoprene, etc., including copolymers thereof with lesser amounts of comonomers such as styrene, acrylonitrile, methyl methacrylate, etc.

Being foamable, the resin is in admixture with a blowing agent, which is preferably a normally gaseous substance but which can be a volatile liquid. In many cases the blowing agent is one that is normally gaseous but which, while under pressure before extrusion, is present in the liquid state. Exemplary of volatile substances that can be used are lower aliphatic hydrocarbons such as ethane, propane, a butane or butene, a pentane or pentene, etc.; lower alkyl halides such as methyl chloride, trichloromethane, 1,2- dichlorotetrafluoroethane, etc.; and inorganic gases such as carbon dioxide and nitrogen. the blowing agent can also be a chemical blowing agent, e.g., a bicarbonate such as sodium bicarbonate, ammonium bicarbonate, etc., or an organic compound that yields nitrogen on heating such as dinitrosopentamethylenediamine, barium azodicarboxylate, etc. The amount of blowing agent employed is often in the range of 3-30%, especially 7-20 percent, based on the weight of the resin. For example, excellent results are achieved by the use of 7-15 percent by weight of butane in conjunction with polystyrene.

The foamable resin preferably also contains a nucleating agent, which assists in the formation of a large number of small cells. the conventional nucleating agents can be employed, e.g., finely divided inert solids such as silica or alumina, preferably in conjunction with zinc stearate, or small quantities of a substance that decomposes at the extrusion temperature to give a gas. Exemplary of the latter class of nucleating agents is sodium bicarbonate, optionally used in conjunction with a weak acid such as tartaric or citric acid. A small proportion of the nucleating agent, e.g., up to 5 percent by weight of the resin, is usually effective.

Since expansion occurs as the foamable resin leaves the die orifice, the dimensions of the orifice are less than the cross section of the desired product. Expansion takes place along both dimensions of the die, but generally greater expansion takes place across the width of the die than along its length. In this way a board is produced. By choice of a suitable die size, an extruded product of the desired cross section can be obtained. For example, a foamed board having a width of 4 feet or more and a thickness of up to perhaps 2 inches can be produced. Generally, the thickness is at least 0.75 inch, e.g., 1.5-4 inches. Often an increase in the dimensions of the board (with a corresponding reduction in density) can be obtained by heating it, preferably by exposing it to steam or hot water in a suitable container for a few moments. Such treatment is usually more effectively conducted after the board has been exposed to the atmosphere for a day or two.

The surfaces defining the zone of lower pressure are maintained at a temperature lower than the extrusion temperature. Oil or water cooling can be employed if desired, and it can be applied, e.g., through channels within the surfaces. Sometimes, however, air cooling sufficient although the backs of the surfaces can be provided with fins in order to increase the cooling rate. Normally the surfaces of the zone lead off directly from the die orifice. It is desirable to prevent as far as possible the conduction of heat from the extruder to the cooled surfaces. This can be achieved, e.g., by the use of a thermally insulating material or by arranging for the area of contact between the surfaces and the extruder to be as small as possible.

Cooling of the surfaces causes a certain amount of "drag" as the resin is extruded so that the viscosity of the resin in contact with the surfaces is much higher than that of the resin within the extruder, and in fact the resin flow through the zone is normally of a "plug" character. The temperature of the zone-defining surfaces (i.e., the average temperature of the mass of metal) to be used in a particular instance depends partly on the nature of the resin and any plasticizing effect of the blowing agent, but it is usually 10°-120° C. lower, preferably 60°-105° C. lower, than the extrusion temperature. For example, when the resin is being extruded at 120° C., it is usually suitable for the zone-defining surfaces to be cooled to a temperature of 10°-40 C.

The extrusion temperature depends to some extent on the softening point of the resin being extruded, but in general temperatures of 95°-140° C., preferably 100°-130° C., are suitable. For example, when foamable polystyrene is being extruded, the temperature is frequently 110°-130° C., particularly about 120° C.

The pressure within the extruder is sufficient to prevent any substantial foaming of the resin until it leaves the die orifice and enters the zone of lower pressure. For example, pressures greater than 250 psi, especially 250-5,000 psi, can be employed. Preferably, the pressure is 300-1,000 psi.

The processes and die assemblies of the invention are of particular value in the production of extruded foamed material, e.g., board, having a low density, e.g., 0.9-1.5 pounds per cubic foot, and a substantial thickness, i.e., at least 1 inch, and e.g., up to about 2.5 inches. However, a broader range of density can be produced, although there is often little advantage to be gained by increasing it above 2 or 3 pounds per cubic foot. A density close to 1 pound per cubic foot, for instance 1-1.5, such as about 1.2 pounds per cubic foot, is usually preferable.

As produced from the die, the extruded resin, e.g., a board has substantially flat upper and lower surfaces and slightly curved edges. These edges can be trimmed if required, but they are often sufficiently true for many purposes.

It is obvious that many variations can be made in the apparatus and processes set forth above without departing from the spirit and scope of this invention.

What is claimed is:

1. In a die assembly suitable for the production of a foamed thermoplastic resin board, the improvement comprising a die assembly having a rectangular die orifice communicating with a zone defined by a pair of opposing concave surfaces that can be cooled and are curved so that, when a foamable resin is extruded through the die, they substantially conform to the corresponding surfaces of the freely expanding resin without exerting a substantial compressive force thereon, the die has extending into it at its inlet end a plurality of separate channels communicating with a number of slits arranged in the form of a network at the outlet end of the die, each slit having a row of channels associated with it.

2. A die assembly of claim 1, wherein each of at least the majority of the meshes of the slit network has a substantially central passage leading back from the front face of the die to the inlet end of the die and not communicating directly with the slits.

3. A die assembly of claim 1, wherein grooves extending from the outlet end of each of at least the majority of the passages toward the outlet of its surrounding mesh of slits are provided in the front face of the die to assist in ensuring that a strand of foamed resin extruded from each passage substantially fills the space formed by the enveloping foamed resin issuing from the surrounding mesh of slits.

4. A die assembly of claim 1, wherein the zone-defining surfaces have a concave cross section corresponding to an arc of a circle.

5. A die assembly of claim 1, wherein the zone-defining surfaces reach their greatest distance apart where the foamed resin is completely expanded and thereafter extend parallel to each other.

* * * * *